United States Patent [19]

Katsumata et al.

[11] Patent Number: 5,399,330
[45] Date of Patent: Mar. 21, 1995

[54] CARBON THREAD AND PROCESS FOR PRODUCING IT

[75] Inventors: Makoto Katsumata; Hidenori Yamanashi; Hitoshi Ushijima, all of Shizuoka, Japan

[73] Assignee: Yazaki Corp., Tokyo, Japan

[21] Appl. No.: 47,066

[22] Filed: Apr. 28, 1993

Related U.S. Application Data

[63] Continuation of Ser. No. 830,082, Feb. 3, 1992, abandoned.

[30] Foreign Application Priority Data

Feb. 15, 1991 [JP] Japan .................................. 3-042331

[51] Int. Cl.⁶ .............................................. D01F 8/00
[52] U.S. Cl. ............................... 423/447.4; 423/445 R; 264/29.2
[58] Field of Search ................ 423/445, 447.1, 447.2, 423/447.3, 447.4, 447.5, 447.6, 447.8, 449; 264/29.1, 29.2, 29.5; 501/95, 35; 427/228

[56] References Cited

U.S. PATENT DOCUMENTS

| | | | |
|---|---|---|---|
| 2,957,756 | 10/1960 | Bacon | 423/447.3 |
| 4,808,475 | 2/1989 | Matsumura et al. | 423/447.1 |
| 4,900,483 | 2/1990 | Witzke et al. | 423/447.3 |

FOREIGN PATENT DOCUMENTS

| | | | |
|---|---|---|---|
| 156512 | 9/1983 | Japan | 423/447.3 |
| 8907163 | 8/1989 | WIPO | 423/447.3 |

*Primary Examiner*—Michael Lewis
*Assistant Examiner*—Stuart L. Hendrickson
*Attorney, Agent, or Firm*—Nikaido, Marmelstein, Murray & Oram

[57] ABSTRACT

In a carbon thread, vapor phase growth carbon fiber (VGCF) are dispersedly contained in a carbon matrix. The carbon thread is produced by forming a thread-like element from a mixture of VGCF and carbonizable carbon-containing compound and then by heat-treating the thread-like element to effect carbonization thereon. The thread-like element may be formed either by melt-spinning or solution-spinning the mixture, or by impregnably adhering the mixture onto a thread of heat resisting fibers. The carbonized carbon thread thus obtained may be subjected to further heat treatment to graphitize the carbon thread.

5 Claims, No Drawings

CARBON THREAD AND PROCESS FOR PRODUCING IT

This application is a continuation of application Ser. No. 07/830,082, filed Feb. 3, 1992, now abandoned.

BACKGROUND OF THE INVENTION

1. Field of the Invention

The present invention relates to a high-conductivity carbon thread usable as a light, conductive element, and, more particularly, to a graphitized carbon thread. The present invention also relates to a process for producing the high-conductivity carbon thread.

2. Related Background Art

Carbon or graphite threads are produced in a method to bake fibers of polyacrylonitrile as referred to as PAN or in a method to melt-spin a coal-originated or a petroleum pitch, to subject the spun fiber to infusible treatment, then to bake it, and, if necessary, further to effect thereon heat treatment at a high temperature for graphitization. The former is called PAN-type carbon fibers and the latter pitch-type fibers. These fibers are generally used for reinforcement. To obtain high elasticity and high strength, as many impurities presenting a hindrance upon the carbonization or the graphitization are removed as possible from the precursor material, i.e., PAN or pitch. However, the thus-produced carbon fibers using such refined precursor materials do not show enough conductivity after the graphitization, for example, approx. $1 \times 10^3$ S/cm of PAN type carbon fibers and approx. $2 \times 10^3$ S/cm of pitch-type carbon fibers. It is considered that this low conductivity is due to insufficient spreading of carbon hexagonal network even after the graphitization as a whole, allowing many grain boundaries and defects to still exist.

On the other hand, vapor-phase growth carbon fibers as referred to as VGCF obtained by thermal decomposition of gasified organic compound at a high temperature show high conductivity, but generally have a short fiber length. Therefore, use of VGCF is limited. Among them, VGCF as described in Japanese Unexamined Patent Publication Tokkaisho 57-117622 are relatively long with an average diameter of 10 $\mu$m and a length of approx. 20 cm, while presenting satisfactory conductivity of $2 \times 10^4$ S/cm after the graphitization. It is, however, difficult to use the VGCF as a conductive wire, since the fibers are discontinuous as well as lacking in mass-producibility.

SUMMARY OF THE INVENTION

The present invention is intended to provide a light, conductive wire with strength, substitutable for metal conductive wires exhibiting insufficient strength comparative to their weights. More specifically, an object of the present invention is to provide a long thread of carbon fiber with high conductivity, which has been impossible to be attained by conventional techniques. Also, it is another object of the present invention to provide a process for producing such a carbon thread.

The above objects of the present invention may be accomplished by a carbon thread in which vapor-phase growth carbon fibers are dispersedly contained in a carbon matrix. Such a carbon thread may be produced by either making thread-like a mixture of vapor-phase growth carbon fibers and carbonizable carbon-containing compound by melt-spinning or solution-spinning thereof, or impregnably adhering such a mixture onto a heat-resisting fiber, and then effecting heat treatment on the thus-obtained thread for carbonization. If necessary, the above-obtained carbon thread may be subjected to further heat treatment to effect graphitization thereon, which may add an especially superior property to the thread.

DETAILED DESCRIPTION OF THE PREFERRED EMBODIMENTS

The vapor-phase carbon fibers or VGCF as a precursor of carbon thread of the present invention may be produced in a base plate method as disclosed, for instance, in Japanese Examined Patent Publication Tokkosho 58-103528, in which a heat resisting base plate carrying growth nuclei of fine grain of transition metal is placed in a reactor, mixed gas of hydrocarbon and hydrogen is brought into contact with the base plate heated, for example, at 1030° to 1300° C. for thermal decomposition, and fibers grow on the plate with diameters between a few and several tens of $\mu$m and lengths between a few and several tens of cm. Also the VGCF may be produced in a fluid bed method as disclosed, for example, in Japanese Unexamined Patent Publication Tokkaisho 58-180615, in which growth nuclei of fine grain of transition metal are suspended in a reaction area of reactor heated at 950° to 1300° C., mixed gas of hydrocarbon and hydrogen is passed therethrough for thermal decomposition, and fibers grow there with diameters between 0.1 and 0.5 $\mu$m and lengths between 10 and 500 $\mu$m.

The VGCF, as produced in the above-described methods, are crushed to have lengths of less than 5 mm with necessity. This crushing is not essential, but preferable because the VGCF not too long are ready to be blended with a carbonizable carbon-containing compound as is hereinafter called as a matrix compound, and convenient for the following processes. Further, the VGCF may be heat-treated at a temperature between 1800° and 2600° C. to be graphitized. This graphitization is not always necessary. It is because the graphitization of VGCF readily proceeds upon high temperature heat treatment after the formation of thread-like mixture of VGCF.

Furthermore, the VGCF may be subjected to the nitric acid treatment, the plasma oxidation treatment, the coupling agent treatment, or other treatments on their surfaces, to reform the surfaces so as to improve the adhesive property thereof with the matrix compound. Such treatments are not essential, so that no inconvenience may be caused without such treatments.

The matrix compound, being one of raw materials of the carbon thread, may be selected from PAN, pitch, or the like, which are generally used to produce carbon fibers, and carbonizable/graphitizable carbon-containing compounds such as thermoplastic resins, e.g., polyvinyl chloride, etc. and as thermosetting resins, e.g., phenol resins, furan resins, etc. In particular, it is preferable to choose a carbon-containing compound which may easily develop the graphite structure upon heat treatment. The matrix compound, however, is not limited to the above-listed materials, but may also be selected from materials within a scope of the present invention.

When said VGCF and matrix compound are blended, the matrix compound may be heated to melt if necessary or may be liquefied by use of solvent or the like, whereby they are readily mixed together. Further, if close kneading of the mixture is required, conventionally known kneading machines and methods may be properly employed.

The blending ratio of VGCF to the matrix compound normally ranges 1 to 80% by weight though depending on a shape of VGCF, a kind or a property of matrix compound, and others. If the blending ratio is below 1% by weight the carbon thread thereof fails to have sufficiently high conductivity. If it is over 80% by weight producing uniform carbon threads is difficult.

To obtain the thread-like form of the above mixture in the present invention, the mixture is extruded and spun from a spinning nozzle by means of the melt-spinning or the solution spinning. The spun thread may be stretched to enhance the orientation of VGCF with necessity. When the pitch or the thermoplastic resins such as polyvinyl chloride, etc. are used as the matrix compound, the spun thread thereof is heat-treated, for example, at a temperature below 600° C. in air for the infusible treatment, and further baked, for example, at a temperature lower than 2000° C. in an inert gas atmosphere to form the carbon thread.

Also, when the thermosetting resins are used as the matrix compound providing the mixture of liquid form, the liquid mixture may be impregnated with and adhered to a core material of heat-resisting fibers such as glass fibers, carbon fibers, aramid fibers, etc. The thus-obtained thread-like element is carbonized in the same method as described above, to provide the carbonized thread.

The carbon thread produced as described above has an excellent conductive property, since the VGCF of superior conductivity are dispersedly contained in the carbon matrix. The carbon thread may be changed into a graphitized carbon thread by further heat-treatment at a temperature over 2000° C. in an inert gas atmosphere. During the graphitization, the VGCF is also further graphitized as well as the carbon matrix, so that the carbon thread thus obtained has more excellent conductivity.

EXAMPLE 1

Fifty parts by weight of VGCF with an average diameter of 0.3 μm and an average length of 100 μm, which were produced in the fluid bed method as described in the afore-mentioned Tokkaisho 58-180615, and a hundred parts by weight of coal tar pitch with a softening point of 80° C. were made molten to mix together. After melt-spinning the mixture, the thread was subjected to the infusible treatment at a temperature of 350° C. in air. Then the thread was baked for thirty minutes at 2800° C. in an argon atmosphere to be graphitized.

The conductivity was measured of the thus-obtained graphitized carbon thread with a diameter of 0.02 mm by the four terminal method. The measured value of conductivity was $2 \times 10^4$ S/cm.

EXAMPLE 2

Fifty parts by weight of VGCF as in Example 1 with the average diameter of 0.3 μm and the average length of 100 μm and fifty parts by weight of resol-type phenol resin in ethanol were uniformly mixed. PAN-type carbon fibers (TORAY, T-300, number of filaments: 1000, total size: 66 g/1000 m, density: 1.76 g/cm³) as a core material were dipped in the above mixture, taken out thereof, and dried for thirty minutes at 80° C. Further, two more cycles of this operation were repeated, whereby thread-like elements were obtained, in which the VGCF mixed resin was adhered by 54 g/1000 m.

The thread-like elements were subjected to the heat treatment at 180° C. to be hardened, then to the oxidation treatment at a temperature of 350° C. in air, and further to the graphitization by baking them for thirty minutes at 2800° C. in the argon atmosphere.

The conductivity was measured of the thus-obtained graphitized carbon thread with a diameter of 0.3 mm by the four terminal method. The measured value of conductivity was $1.2 \times 10^4$ S/cm.

As described above, the present invention provides the carbon threads having an excellent conductivity as compared with conventional carbon threads. The carbon thread of the present invention is light and high in chemical resistance with the high conductivity, so that it may be suitably used as a conductive wire.

What is claimed is:

1. A process for producing a carbon thread in which VGCF are dispersedly contained in a carbon matrix, comprising a first step to impregnably adhere a mixture of VGCF and carbonizable carbon-containing compound onto a heat-resisting fiber thread, and a second step to heat-treat the mixture adhered thread for carbonization thereof.

2. A process for producing a carbon thread according to claim 1, further comprising a step to graphitize the carbonized thread.

3. A method for processing an extrudable and carbonizable vapor phase growth carbon fiber (VGCF) composite into a thread-like form, comprising forming a mixture of VGCF and a carbonizable carbon-containing compound, forming a thread from said mixture by extruding said composite onto a heat-resisting fiber, and carbonizing the resulting thread.

4. The method according to claim 3 further comprising graphitizing said extruded thread-like composite.

5. A process for producing a carbon thread in which VGCF are uniformly dispersed in a carbon matrix, comprising the steps of:
   a) forming a mixture of VGCF and a carbonizable carbon containing compound,
   b) impregnably adhering said mixture onto a heat resisting fiber thread,
   c) carbonizing said thread to produce a carbon thread.

* * * * *